(12) United States Patent
Reijersen Van Buuren

(10) Patent No.: US 8,627,765 B2
(45) Date of Patent: Jan. 14, 2014

(54) BALING DEVICE TO FORM BALES OF CROP MATERIAL

(75) Inventor: Willem Jacobus Reijersen Van Buuren, Dirksland (NL)

(73) Assignee: Lely Patent N.V., Maassluis (*) Notice: Subject to any disclaimer, the term of this patent is extended or adjusted under 35 U.S.C. 154(b) by 0 days.

(21) Appl. No.: 13/456,233

(22) Filed: Apr. 26, 2012

(65) Prior Publication Data
US 2012/0204734 A1 Aug. 16, 2012

Related U.S. Application Data

(63) Continuation of application No. PCT/NL2010/000159, filed on Nov. 2, 2010.

(30) Foreign Application Priority Data

Nov. 2, 2009 (NL) .................................... 1037435

(51) Int. Cl.
*A01F 15/07* (2006.01)
*A01F 15/10* (2006.01)

(52) U.S. Cl.
CPC .................................. *A01F 15/0705* (2013.01)
USPC .................... 100/40; 100/88; 56/341

(58) Field of Classification Search
USPC .................. 100/5, 87, 88, 40; 56/341
See application file for complete search history.

(56) References Cited

U.S. PATENT DOCUMENTS

| 4,062,172 | A | | 12/1977 | Rice et al. |
| 4,262,478 | A | | 4/1981 | Pentith |
| 4,517,891 | A | | 5/1985 | Henry |
| 4,534,285 | A | * | 8/1985 | Underhill ........................ 100/88 |
| 4,667,592 | A | | 5/1987 | Pentith et al. |
| 4,914,900 | A | | 4/1990 | Viaud |
| 6,729,118 | B2 | * | 5/2004 | Viaud ............................ 56/341 |

FOREIGN PATENT DOCUMENTS

| DE | 19606230 A1 | 8/1997 |
| EP | 0254337 A1 | 1/1988 |
| EP | 1264532 A1 | 12/2002 |

OTHER PUBLICATIONS

International Search Report of PCT/NL2010.000159, issued on Jan. 13, 2011.

* cited by examiner

*Primary Examiner* — Jimmy T Nguyen
(74) *Attorney, Agent, or Firm* — Hoyng Monegier LLP; Coraline J. Haitjema; David P. Owen

(57) ABSTRACT

The invention relates to a baling device for forming cylindrical bales of crop material, including a frame, an intake device, a bale forming device, and a pre-baling device to form, when desired, a pre-bale, wherein the pre-baling device includes a lower conveyor belt and an upper conveyor belt, between which a pre-bale can be formed. At least one of the lower and upper conveyor belt is movable to and from the other of the lower and upper conveyor belt, wherein the baling device can at least be arranged in a baling position in which crop material is transferred to the bale forming device, and a pre-baling position in which crop material is received in the pre-baling device to form a pre-bale.

14 Claims, 2 Drawing Sheets

BALING DEVICE TO FORM BALES OF CROP MATERIAL

CROSS REFERENCE TO RELATED APPLICATIONS

This application is a continuation of PCT application No. PCT/NL2010/000159 filed on 2 Nov. 2010, which claims priority from Netherlands application No. 1037435 filed on 2 Nov. 2009. Both applications are hereby incorporated by reference in their entireties.

BACKGROUND OF THE INVENTION

1. Field of the Invention

The present invention relates to a baling device to form bales of crop material.

A baling device is an agricultural unit to form bales of crop material. The baling device usually comprises an intake device to take up crop material from the ground and a bale forming device to form a bale from the crop material.

2. Description of the Related Art

When a bale of a desired size or density has been formed in the bale forming device, it has to be ejected from the bale forming device. Often the bale is covered by netting before ejection.

It takes a period of time to cover the bales in netting and to eject the bale from the bale forming device. Without further measures the intake of crop material has to be stopped during this period of time. In practice, this means that the vehicle pulling the baling device has be stopped to avoid that new crop material is introduced in the baling device. However, it is desirable to continuously take in crop material so that a continuous baling process is obtained.

It is known to provide a baling device which is capable of temporarily storing a quantity of crop material during netting and ejecting of a bale.

U.S. Pat. No. 4,914,900, which is incorporated by reference in its entirety, discloses a baling device having a temporary storage for crop material. When no crop material can be introduced in the baling device, the crop material is temporarily stored in the temporary storage, until the baling device is ready to receive this crop material.

DE 37 34 850 which is incorporated by reference in its entirety, discloses a baling device having a device creating a temporary storage space by placing a separation element in the flow of crop material which holds the crop material until the bale forming device is ready to receive the crop material in the temporary storage.

In other baling devices, such as disclosed in DE 19606230, U.S. Pat. No. 4,667,592, and EP 1264532, which are all incorporated by reference in their entireties, it has been proposed to provide two baling chambers, one of which may be of smaller dimensions. During ejection of a bale from the second, larger baling chamber, formation of a bale may be started in the first baling chamber. After ejection of the finished bale from the second baling chamber, the new formed bale in the first baling chamber may be transferred from this smaller baling chamber to the second baling chamber. In the second baling chamber, formation of the bale continues until the bale has the desired dimension or density. When the bale has the desired dimension or density, the new bale may be ejected from the baling device.

BRIEF SUMMARY OF THE INVENTION

It is an aim of the invention to provide a baling device having an alternative pre-baling device.

The aim of the invention is achieved with a baling device to form cylindrical bales of crop material, comprising:
a frame,
an intake device having an inlet and an outlet, wherein the intake device is arranged on the frame to take in crop material via the inlet,
a bale forming device arranged on the frame for forming a bale from said crop material;
a pre-baling device arranged between the intake device and the bale forming device to form, when desired, a pre-bale, wherein, the pre-baling device comprises a lower conveyor belt and an upper conveyor belt, between which a pre-bale can be formed, wherein at least one of the lower and upper conveyor belt is movable to and from the other of the lower and upper conveyor belt,
wherein said baling device can at least be arranged in a baling position in which crop material is transferred from the outlet of the intake device to the bale forming device, and a pre-baling position in which crop material is received in the pre-baling device to form a pre-bale.

A pre-baling device is a device in which only a bale can be formed of smaller diameter than the final desired diameter, but not a bale with the final diameter. This bale of smaller diameter is called the pre-bale. This pre-bale is transferred to a further bale forming device of the baling device in which the size of the bale can be increased until the bale has the desired dimension or density. The bale forming device may be capable of forming a complete bale without having a pre-bale available at the beginning of the bale forming process.

The pre-baling device of the invention comprises two conveyor belts between which, when desired a pre-bale can be formed. This pre-baling device is of relative simple construction, and baling can be made relative compact, resulting in a compact design of the whole baling device.

The size of the pre-baling chamber is preferably adapted to a maximum amount of crop material that can be taken in by the baling device during a period of netting and ejecting of a completed bale from the bale forming device.

In an embodiment, the lower conveyor belt is mounted stationary and the upper conveyor belt is mounted movably on the frame. When the lower conveyor belt is stationary, only one of the conveyor belts has to be mounted movably, which makes the construction even more simple and reliable.

In an embodiment, each of the lower and upper conveyor belt have a first end arranged next to the intake device and a second end arranged next to the bale forming device, wherein in the pre-baling position, the second ends of the lower and upper conveyor are closer to each other than the first ends. By bringing the second ends of the conveyor belts together, the crop material is held in the pre-baling device, and a pre-bale can be formed in the pre-baling device. Preferably, the second ends are brought so close together that, in the pre-baling position, no crop material can pass the pre-baling chamber towards the baling device.

In an embodiment, in the baling position the distance between the first ends is substantially equal to the distance between the second ends. In the baling position, the pre-baling device may only be used to transfer crop material from the intake device to the bale forming device. The lower conveyor belt will mainly be used for this transfer of crop material. By locating the upper conveyor belt substantially parallel to the lower conveyor belt, the upper conveyor belt does not hinder this transfer of crop material. When the upper conveyor belt is driven in the same direction as the lower conveyor belt, the upper conveyor belt may improve the transfer of crop material towards the bale forming device.

It is remarked that the directions of driving of the endless belts of the conveyor belts are defined with respect to the sides of the respective conveyor belt that will be in contact with crop material, i.e. the upper side of the lower conveyor belt and the lower side of the upper conveyor belt. Thus, when it is defined that the conveyor belts are driven in the same direction, one of the endless belts will run clockwise and the other endless belt will run counter-clockwise with the result that at the sides of the conveyor belts facing each other, the endless belts will run in the same direction.

In an embodiment, each conveyor belt comprises an endless belt and a first roller and a second roller, wherein the first roller is arranged at the first end of the conveyor belt and the second roller is arranged at the second end of the conveyor belt.

In an embodiment, the baling device can be arranged in a pre-bale ejection position in which a pre-bale formed in the pre-baling chamber may be ejected towards the bale forming device. When the bale forming device is ready to receive crop material, a pre-bale formed in the pre-baling device can be ejected in the bale-forming device. The ejection of the pre-bale may be improved by decreasing the distance between the conveyor belts, for instance by making the distance between the first ends smaller than the distance between the second ends, and/or by driving the upper conveyor belt in the same direction as the lower conveyor belt.

In an embodiment, the lower and upper conveyor belts are driven in the same direction, when the pre-baling device is in the baling position, and in opposite directions, when the pre-baling device is in the pre-baling position. By driving the lower and upper conveyor belts in the same direction, the transfer of crop material from the intake device to the bale forming device is improved, while by driving the lower and upper conveyor belts in opposite direction, the formation of the pre-bale is improved.

The invention further relates to a method for substantially continuously forming bales in the baling device of any of the preceding claims, comprising the steps of continuously taking up crop material with the intake device from the ground via the inlet and pressing the crop material out of the outlet of the intake device, forming a bale in the bale forming device by feeding the bale forming device with crop material until a bale of desired dimension or density is formed, while the pre-baling device is in the baling position, bringing the pre-baling device in the pre-baling position and forming a pre-bale in the pre-baling device when no crop material can be introduced in the bale forming device, and transferring the formed pre-bale to the bale forming device to form a complete bale.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
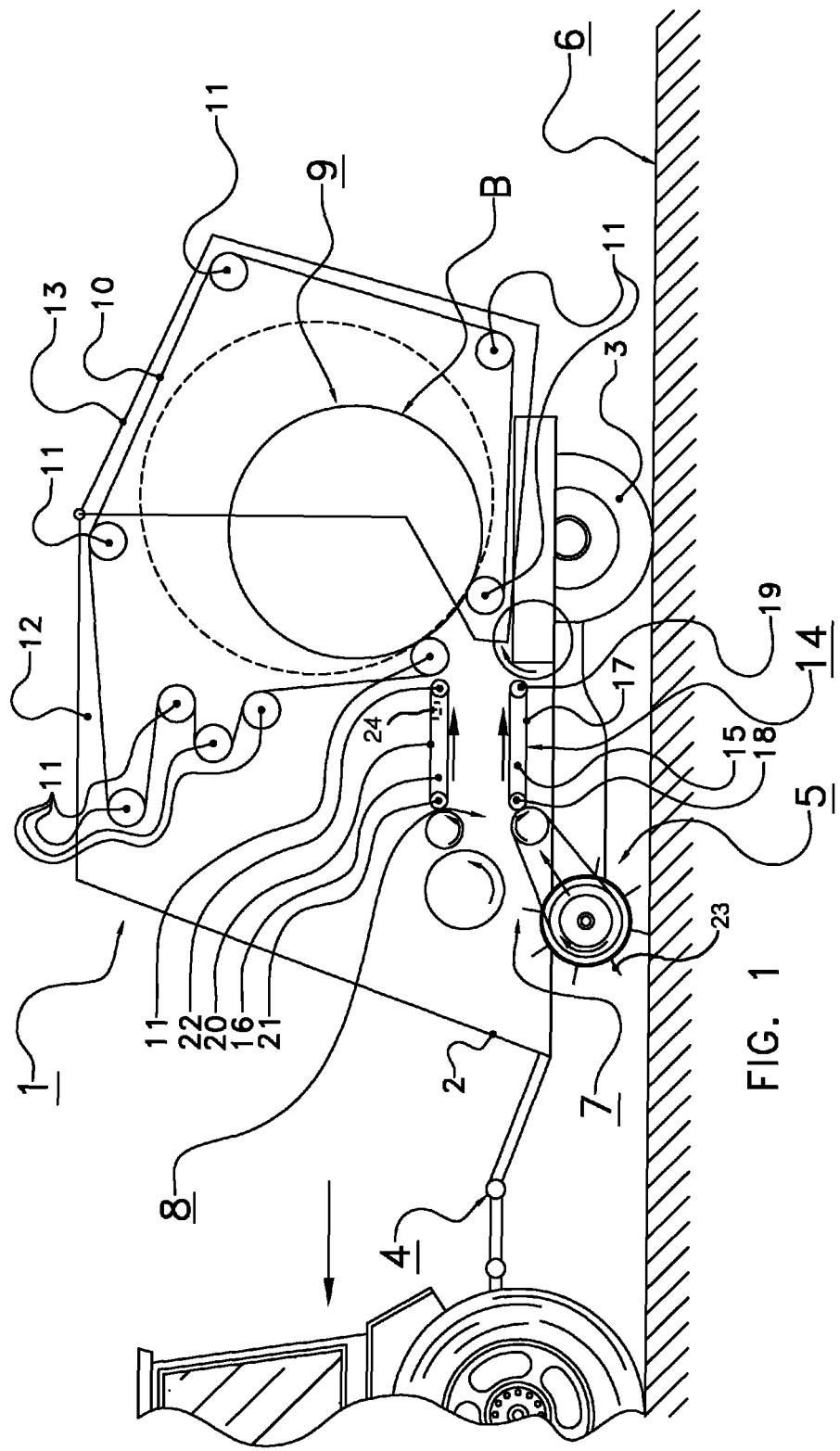
FIG. 1 shows a side view of a baling device according to the invention.

The following is a description of certain embodiments of the invention, given by way of example only and with reference to the drawings. Referring to FIG. 1, it shows a baling device, generally indicated with the reference numeral 1. The baling device 1 comprises a frame 2 which is supported by wheels 3. The baling device 1 is configured to be connected at its front end 4 to a pulling vehicle, for instance a tractor.

The baling device 1 comprises an intake device 5 to take in crop material, i.e. agricultural harvested material, such as silage, grass, hay, or straw from a ground surface 6. The intake device 5 comprises an inlet 7 and an outlet 8.

Via the inlet 7 crop material is taken from the ground and transported to the outlet 8. A roll provided at the inlet 7 may be provided with tines 23 to facilitate the picking up of crop material.

A bale forming device 9 is arranged on the frame 2 to form bales of crop material. The bale forming device 9 comprises an endless belt 10 and a number of rollers 11 divided over a stationary part 12 of the baling device and a tail gate 13. The tail gate 13 is provided to make ejection of the bale B after formation of the bale to a desired diameter possible.

Other bale forming devices with or without a tailgate capable of forming a bale from crop material may also be applied.

Between the outlet 8 of the intake device 5 and the bale forming device 9 a pre-baling device 14 is arranged. The pre-baling device 14 comprises a lower conveyor belt 15 and an upper conveyor belt 16.

Each of the lower conveyor belt 15 and upper conveyor belt 16 comprises a first end at the side of the intake device 5 and a second end at the side of the bale forming device 9.

The lower conveyor belt 15 comprises an endless belt 17 supported at the first end by a first roller 18 and at the second end by a second roller 19. The upper conveyor belt 16 comprises an endless belt 20, at the first end a first roller 21 and at the second end a second roller 22. Each of the lower and upper conveyor belt 15, 16 comprises a driving device 23 and 24 to drive the endless belt 17, 20 in a desired direction. At least the driving device of the upper conveyor belt may be designed to drive the endless belt 20 in opposite directions, and possibly at different speeds. In the shown embodiment, the lower conveyor belt 15 may be continuously driven at the same speed and in the same direction.

The endless belts 17, 20 may be made of any suitable material and are preferably provided with means for entraining crop material, such as rims, or small tines, or such.

The lower conveyor belt 15 is mounted stationary on the frame 2. The first roller 18 and the second roller are both arranged on a fixed pivot axis.

The first roller 21 and the second roller 22 are movably with respect to the frame 2 so that the upper conveyor belt 16 can be brought in different positions with respect to the lower conveyor belt 15. The first roller 21 is movable towards the first roller 18 of the lower conveyor belt 15 so that the first ends of the lower and upper conveyor belts can be brought towards each other. Similarly, the second roller 22 is movable towards the second roller 19 of the lower conveyor belt 15 so that the second ends of the lower and upper conveyor belts can be brought towards each other.

Any suitable means may be provided to move the first and second roller 21, 22 of the upper conveyor belt 16 with respect to the frame 2. For instance, the pivot axes of the rollers 21, 22 may be arranged on a pivotably mounted arm which may be located in different positions by a hydraulic actuator arranged between the frame 2 and the respective arm.

The different positions of the upper conveyor belt may be used to bring the pre-baling device 14 in different positions for different functions of the pre-baling device 14. Generally, the pre-baling device 14 can at least be arranged in a baling position, a pre-baling position and a pre-bale ejecting position.

In FIG. 1, the pre-baling device is shown in the baling position. In this position all crop material entering the pre-baling device 14 from the intake device is directly transferred to the bale-forming device 9. For this reason, both the lower conveyor belt 15 and upper conveyor belt 16 are driven in the same direction, as indicated by arrows, to transfer crop material towards the bale forming device 9.

FIGS. 2a-2e show different positions of the pre-baling device 14.

Figure 2A:
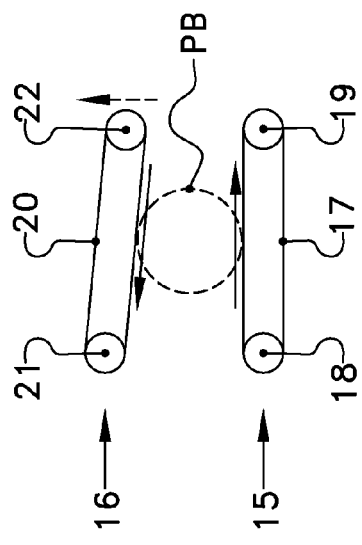
FIGS. 2a-2e show side views of different positions of the conveyor belts of the pre-baling device of FIG. 1.

FIG. 2a shows the pre-baling device 14 in the baling position. In this baling position, the upper conveyor belt 16 is arranged in its upper position, wherein the first and second rollers of the pre-baling device 14 are arranged in the upper positions. In this position, the distance between the first rollers 18, 21 is substantially equal to the distance between the second rollers 19, 22. The upper conveyor belt 16 does, in this upper position not hinder the transfer of crop material to the bale forming device 9.

The endless belts are driven in the same direction so that crop material is transferred towards the bale-forming device 9. In another embodiment, the endless belt of upper conveyor belt 16 may not be driven, since the crop material will mainly be supported by the lower conveyor belt 15.

Figure 2B:
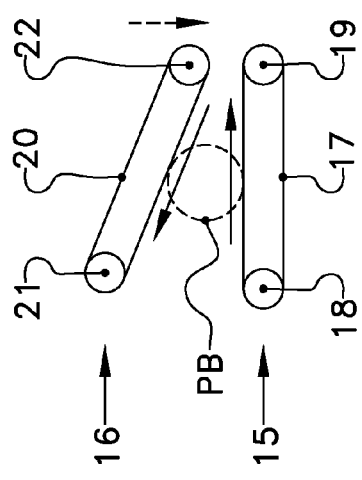

In FIG. 2b, the pre-baling device 14 is shown in the pre-baling position. When a net is arranged about a bale or when a bale is ejected from the bale forming device, crop material cannot be introduced in the bale forming device 9. To make continuously baling possible, this crop material is accumulated in the pre-baling device 14 by placing the pre-baling device 14 in the pre-baling position.

In the pre-baling position, the second roller 22 of the upper conveyor belt 16 is brought towards the second roller 19 of the lower conveyor belt 15 to stop crop material from being transferred to the bale forming device 9. Further, the upper conveyor belt 16 is driven in opposite direction with respect to the lower conveyor belt 15. Due to the opposite movement, crop material which comes into contact with the upper conveyor belt 16 may be moved back towards the first end of the conveyor belts. When the crop material falls down it may again be moved towards the second end by the movement of the endless belt 17 of the lower conveyor belt.

Figure 2C:
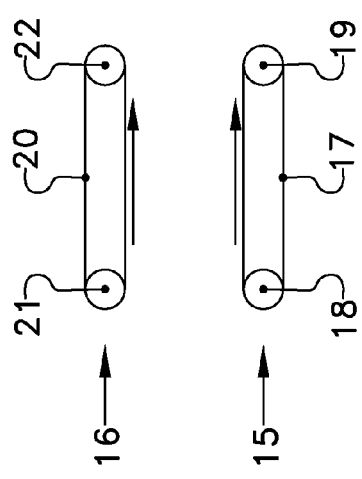

As a result of these movements of crop material, a pre-bale PB may be formed of crop material accumulating in the pre-baling device 14. This pre-bale PB may increase in size with further crop material taken in by the intake device 5. To increase the space available for the pre-bale PB the second roller 22 of the upper conveyor belt 16 may be moved upwardly, as shown in FIG. 2c. However, it should be avoided that crop material is introduced too early in the bale forming device 9.

When the bale forming device 9 is ready to form a new bale, e.g. when the tailgate is closed after ejecting a bale in the baling device of FIG. 1, the pre-baling device 14 may be brought back to the baling position or in a pre-bale ejecting position to eject the formed pre-bale to the bale forming device to enlarge the bale to a desired dimension.

Figure 2D:
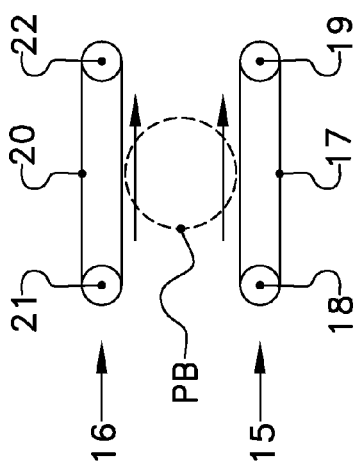

To eject the bale from the pre-baling device 14, see FIG. 2d, the second roller 22 of the upper conveyor belt is moved upwards toward its upper position, and the speed of the endless belt 20 in the opposite direction of the pre-baling position is decreased, and may be brought to zero or changed to a certain speed in the same direction as the lower conveyor belt 15. The pre-baling device 14 is now in the baling position.

In this baling position the upper conveyor 16 may no longer be in contact with the pre-bale PB as the first and second roller 21, 22 of the upper conveyor belt 16 are moved to the upper positions. To promote the ejection of the pre-bale PB to the bale forming device 9, the upper conveyor belt may be lowered to contact the pre-bale PB, whereby preferably the first roller 21 is located closer to the first roller 18 than the second roller 22 is located to the second roller 19.

Figure 2E:
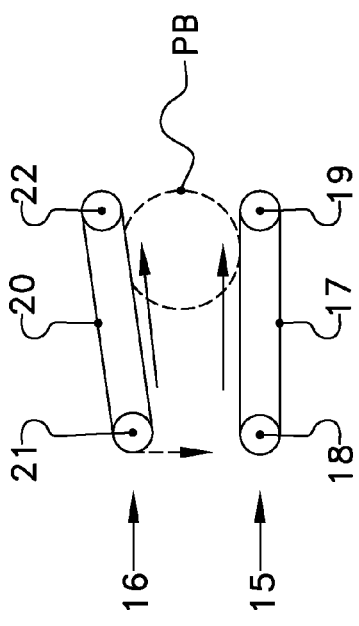

FIG. 2e shows this pre-bale ejecting position of the pre-baling device 14, in which ejecting of the pre-bale is promoted.

When the pre-bale is ejected from the pre-baling device 14, the upper conveyor belt 16 may be brought back to the upper position to bring the pre-baling device 14 in the baling position, as shown in FIG. 2a. In this baling position crop material is directly transferred to the bale forming device 9 to increase in the bale forming device 9 the size of the pre-bale PB originally formed in the pre-baling device 14 to obtain a bale B of desired size or density.

After the formation of this new bale is finished, the pre-baling device 14 may again be brought in the pre-baling position to accumulate crop material which cannot be transferred to the bale forming device 9 during netting and ejecting of the bale.

Hereinabove, a pre-baling device for use in a baling device has been described. The term lower and upper have been used to describe two conveyor belts between which crop material may be transferred to a bale forming device and, if necessary, crop material may be temporarily accumulated. The use of the terms lower and upper should not be construed narrowly to pre-baling devices arranged in a substantially horizontal plane. The two conveyor belts may be arranged in any suitable orientation.

Further, it is remarked that the pre-baling device has been described with respect to a baling device with a baling chamber of variable size. The pre-baling device may also be applied in a baling chamber with fixed size. Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A baling device to form bales of crop material, comprising:
   a frame,
   an intake device having an inlet and an outlet, wherein the intake device is arranged on the frame to take in crop material via the inlet,
   a bale forming device arranged on the frame for forming a bale from said crop material, and
   a pre-baling device arranged between the intake device and the bale forming device to form, when desired, a pre-bale, the pre-baling device being movable between a pre-bale position and a baling position, the pre-baling device further comprising
   a lower conveyor belt and an upper conveyor belt, wherein at least one of the lower and upper conveyor belt is movable to and from the other of the lower and upper conveyor belt, each of the lower conveyor belt and upper conveyor belt having a first end arranged next to the intake device and a second end arranged next to the bale forming device,
   wherein, in the baling position, the lower conveyor belt and the upper conveyor belt are driven in the same direction, said pre-baling device is arranged to directly transfer crop material from the outlet of the intake device to the bale forming device, and wherein, in the pre-baling position, the lower conveyor belt and the upper conveyor belt are driven in opposite directions in order to receive crop material and to form a pre-bale.

2. The baling device of claim 1, wherein the lower conveyor belt is mounted stationary and the upper conveyor belt is mounted movably on the frame.

3. The baling device of claim 1, wherein in the pre-baling position, the second ends of the lower and upper conveyor belts are closer to each other than the first ends.

4. The baling device of claim 3, wherein in the baling position the distance between the first ends is substantially equal to the distance between the second ends.

5. The baling device of claim 3, wherein each of the lower conveyor belt and the upper conveyor belt comprises an endless belt and a first roller and a second roller, wherein the first roller is arranged at the first end of the conveyor belt and the second roller is arranged at the second end of the conveyor belt.

6. The baling device of claim 1, wherein the baling device is arranged in a pre-bale ejection position in which the pre-bale formed in the pre-baling device can be ejected towards the bale forming device.

7. The baling device of claim 6, wherein in the pre-bale ejection position the first ends of the lower and upper conveyor belts are closer to each other than the second ends.

8. The baling device of claim 1, wherein a maximum size of a pre-bale to be formed in the pre-baling device is adapted to a maximum amount of crop material taken in by the intake device during at least one of netting and ejecting of a complete bale in the baling device.

9. The baling device of claim 8, wherein an amount of crop material in a pre-bale of maximum size substantially corresponds to the maximum amount of crop material taken in during at least one of netting and ejecting of a complete bale in the baling device.

10. A method for continuously forming bales the method comprising the steps of:
providing a baling device to form bales of crop material, the baling device comprising:
a frame,
an intake device having an inlet and an outlet, wherein the intake device is arranged on the frame to take in crop material via the inlet, and a pre-baling device arranged between the intake device and a bale forming device to form, when desired, a prebale,
the pre-baling device comprising a lower conveyor belt and an upper conveyor belt, between which a pre-bale can be formed, wherein at least one of the lower and upper conveyor belt is movable to and from the other of the lower and upper conveyor belt,
continuously taking up crop material with the intake device from a ground surface via the inlet and pressing the crop material out of the outlet of the intake device,
positioning the pre-baling device in a baling position, the lower conveyor belt and the upper conveyor belt are driven in the same direction, thereby directly transferring the crop material from the outlet of the intake device to the bale-forming device,
forming a bale in the bale forming device by feeding the bale forming device with crop material until a bale of desired dimension or density is formed, while the pre-baling device is in the baling position,
bringing the pre-baling device in a pre-baling position and forming a pre-bale in the pre-baling device when no crop material can be introduced in the bale forming device, wherein, in the pre-baling position the lower conveyor belt and the upper conveyor belt are driven in opposite directions in order to receive crop material and to form a pre-bale, once the pre-bale is formed,
and transferring the formed pre-bale from the pre-baling device directly to the bale forming device to form a complete bale.

11. The baling device of claim 1, wherein the bailing device is adapted such that the pre-baling device is in the baling position while the bale forming device is forming a bale, and wherein the baling device is adapted such that the pre-baling device is brought in the pre-baling position when no crop material can be introduced in the bale forming device.

12. The baling device of claim 1, wherein in the baling position, the upper and lower conveyor belts of the pre-baling device are substantially parallel.

13. The method of claim 10, wherein in the baling position, the upper and lower conveyor belts of the pre-baling device are substantially parallel.

14. The method of claim 10, further comprising forming a pre-bale ejection position in which a pre-bale formed in the pre-baling device can be ejected towards the bale forming device.

* * * * *